(12) United States Patent
Ijspeert

(10) Patent No.: US 6,585,381 B2
(45) Date of Patent: Jul. 1, 2003

(54) PRESENTATION AND STORAGE FOLDER ALLOWING PROJECTION OF OVERHEAD TRANSPARENCIES WITHOUT DETACHING THESE FROM THEIR BINDER

(76) Inventor: Albert Jan Ijspeert, 12 Chemin des Bois-Jacquet, Aire (CH), CH-1219

( * ) Notice: Subject to any disclaimer, the term of this patent is extended or adjusted under 35 U.S.C. 154(b) by 0 days.

(21) Appl. No.: 09/813,852

(22) Filed: Mar. 22, 2001

(65) Prior Publication Data

US 2001/0026353 A1 Oct. 4, 2001

(30) Foreign Application Priority Data

Mar. 28, 2000 (CH) .......................................... 2000/0592

(51) Int. Cl.[7] .............................................. G03B 21/00
(52) U.S. Cl. .................................. 353/120; 353/DIG. 5
(58) Field of Search ........................... 353/120, DIG. 5, 353/22, 23, 24; 40/701, 721, 106

(56) References Cited

U.S. PATENT DOCUMENTS

| | | | | |
|---|---|---|---|---|
| 3,561,862 A | * | 2/1971 | Albee, Jr. | .................... 353/122 |
| 3,609,026 A | * | 9/1971 | Verebay | ...................... 353/103 |
| 3,709,590 A | * | 1/1973 | Bisberg | ....................... 353/120 |
| 4,707,092 A | * | 11/1987 | Mindell | ....................... 353/109 |

* cited by examiner

Primary Examiner—Russell Adams
Assistant Examiner—Andrew Sever
(74) Attorney, Agent, or Firm—Gene Scott-Patent Law & Venture Group

(57) ABSTRACT

The presentation and storage folder (10) allows filing of transparencies in a normal binder (1) and in addition allows projecting these on an overhead projector (2) without detaching these from their binder. The folder is composed of at least three leaves the first of which (11) allows to file it in a classical binder, the last (13) being composed of the transparency or of a transparent pocket which can contain the transparency proper whereas the leaf or leaves in between (12) allow to unfold the folder and place the transparency on the glass of an overhead projector without needing to detach the folder from the binder.

19 Claims, 3 Drawing Sheets

PRESENTATION AND STORAGE FOLDER ALLOWING PROJECTION OF OVERHEAD TRANSPARENCIES WITHOUT DETACHING THESE FROM THEIR BINDER

CROSS-REFERENCE TO RELATED APPLICATIONS

This application claims the priority of the filing in Switzerland, Swiss application number: 2000 0592/00, of Mar. 28, 2000.

STATEMENT REGARDING FEDERALLY SPONSORED R&D

Not applicable.

REFERENCE TO A MICROFICHE APPENDIX

Not applicable.

BACKGROUND OF THE INVENTION

1. Technical Field

The invention is in the field of filing documents in files and in particular in that of envelopes used to file and to present transparencies for overhead projectors.

2. Description of Prior Art

In order to present transparencies by means of an overhead projector it is necessary to take the transparencies, or the storage pockets with the transparencies, out of their filing system, in general in taking them out of their ring binder, and to put each transparency back there after projection. To gain time, the shown transparencies are often piled up on the table, to be put back in the file once the projection session has finished. If some of the transparencies need to be projected again during the same session they must be taken out of this heap of transparencies already projected and the disorder that installs makes it more and more complicated to find back a specific transparency.

The usual storage and protection pockets like U.S. Pat. No. 5,486,883A allow storage in a binder whereas others like U.S. Pat. No. 5,622,420 add to that the feature of masking the left and right of the projected image, but they all need to be taken out of the binder for projection. A number of people have investigated the problem of how to present the transparencies with a good border and at the same time well filed and this has resulted in the development of different special binders that can be placed on the glass of the overhead projector such that the transparencies can be projected in a well defined position on the glass still staying attached to the binder or moving between two binders. For instance the U.S. Pat. No. 4,203,659, U.S. Pat. No. 3,709,590, U.S. Pat. No. 3,544,211 and U.S. Pat. No. 3,537,792 use a single binder placed on the glass of the overhead projector whereas the U.S. Pat. No. 5,676,443 and U.S. Pat. No. 5,321,451 use a double binder placed on the projector glass transferring the transparencies from one binder to the other. Another solution published in U.S. Pat. No. 4,707,092 consists of attaching the transparencies one to another in the form of an "accordion", at the start placed on the table at one side of the projector, and to transfer the transparencies from one side of the projector to the other in passing them on the glass of the projector.

One of the drawbacks of these more sophisticated systems is the need for additional supports, suckers or considerable counter weights to stabilize the heavy binder on the glass of the overhead projector or to guide the transparencies. The mayor drawback however seems to me the fact that all these binders are special and different from the classical binder types one finds in all the bookshops and which are practical for the filing of any documents be it papers or transparencies.

SUMMARY OF THE INVENTION

The main object of this invention is to be able to keep the transparencies attached to their file during the projection, in order to keep always the filing order and therefore the facility to find a particular transparency back, but this in such a way as to avoid the problems linked to the existing techniques mentioned above.

Another object is to reach this objective without the need for a special filing system like a special type of binder such that one can apply it to any type of book or binder.

In particular in the case of standard ring binders, the object is that transparencies can be filed like any other document and if desired between any other document, implying also an entire freedom to move the transparencies from one binder to another or to change their order in the actual binder.

Another object is to keep the book or binder independent from the type of overhead projector used and to be able to project the transparencies while the binder has simply been placed on the table next to the overhead projector, including a certain flexibility for what concerns the position of the overhead projector and in particular the height of the glass of the overhead projector as compared to the place of the binder.

In order to reach these objectives the inventive effort has neither been put in the conception of the book or binder, nor in the conception of the overhead projector but uniquely in the conception of the document holder (Folder) that fixes the transparency in the binder. This holder, usually made as a pocket of transparent plastic, has here been made of a succession of pockets or foils, of paper or plastic or a combination of the two materials, assembled in the form of a folder with at least 3 consecutive leaves. The first of these leaves has the perforations or other means necessary to file the support in a classical binder or book. The third, or even later, leaf consists of a transparent pocket that contains the transparency or it consists of the bare transparency itself. The leaf or leaves in between allow unfolding the transparency to a position outside the binder. Folded in the binder, the transparencies can be consulted and seen like any other usual document in a binder.

There are two ways of folding the holder. One is the folding as an "accordion". In this case the folded holder places the transparency on top of the intermediate leaves and the transparency can be read on the background of the other pages and, in particular if the for-last leaf is non-transparent, the transparency will be easily readable thanks to that background.

The second possibility is to fold the holder as an "envelope" such that the transparency, the third leaf for instance, folds inside the two leaves before, in this example the second and first leaves, that will form together a protection for the transparency. In this second case the transparency is situated under the for-last leaf (i.e. the second leaf) but is still perfectly readable if this second leaf, which protects the transparency, is now transparent and not non-transparent as in the first case. (In the Description further on the "accordion" type of folding has been taken for the example).

In order to project the transparencies on the overhead projector, the binder, in general a standard binder, which contains the transparencies each inserted in its folder, is placed on a table next to the overhead projector and is opened selecting the desired transparency. This transparency is then brought outside the binder by unfolding the folder and is placed on the glass of the overhead projector without a need of detaching the folder from the binder nor a need of taking the transparency out of the folder. This thanks to the intermediate leaves of the folder that allow a certain freedom to place the transparency, in its pocket, on the projector glass, which can be considerably higher than the surface of the table, and to align the transparency with the orientation of the glass. Equipping the leaf (pocket) that contains the transparency with a re-usable sticker allows sticking the leaf temporarily on the glass stabilizing in this way the position of the transparency. After its projection the folder containing the transparency is folded back into the binder and any other transparency can be selected and projected.

The unfolding and folding can be done over the longer side or over the shorter side of the sheet format used. The first direction of folding is most natural for the projection of transparencies that have a "portrait" orientation whereas the second is more indicated for transparencies with "landscape" orientation.

While the transparency is exposed on the projector glass the insides of the first and second leaves become visible. This can be used to show the text that accompanies the projected transparency, or any other useful information, by making these leaves in the form of transparent envelopes in which these texts can be filed. If the first leaf is transparent and not used for filing, it allows viewing the following transparency in the binder as useful information for the speaker.

An extra leaf can be foreseen beyond the transparency for similar filing purposes but in particular to create a shadow next to the image of the projected transparency in the same way as the last leaf before the transparency can create such a shadow on that side of the transparency if it is non-transparent or a transparent envelope filled with a paper that can contain the text.

Finally, one of the pages can be equipped with a tab that sticks protrudes outside the standard format and that allows to select more easily one or the other of the transparencies in the binder amongst the filed folders.

A special version of this folder for the filing and projection of transparencies on an overhead projector is that where the leaf, used to file the transparency, is absent or is reduced to a narrow rim such that afterwards the transparent envelop or the transparency itself can be fixed on that by the user by any means of a fixation like for example an adhesive band.

BRIEF DESCRIPTION OF THE SEVERAL VIEWS OF THE DRAWINGS

The following drawings allow a better understanding of the invention.

DETAILED DESCRIPTION OF THE INVENTION

Figure 1:
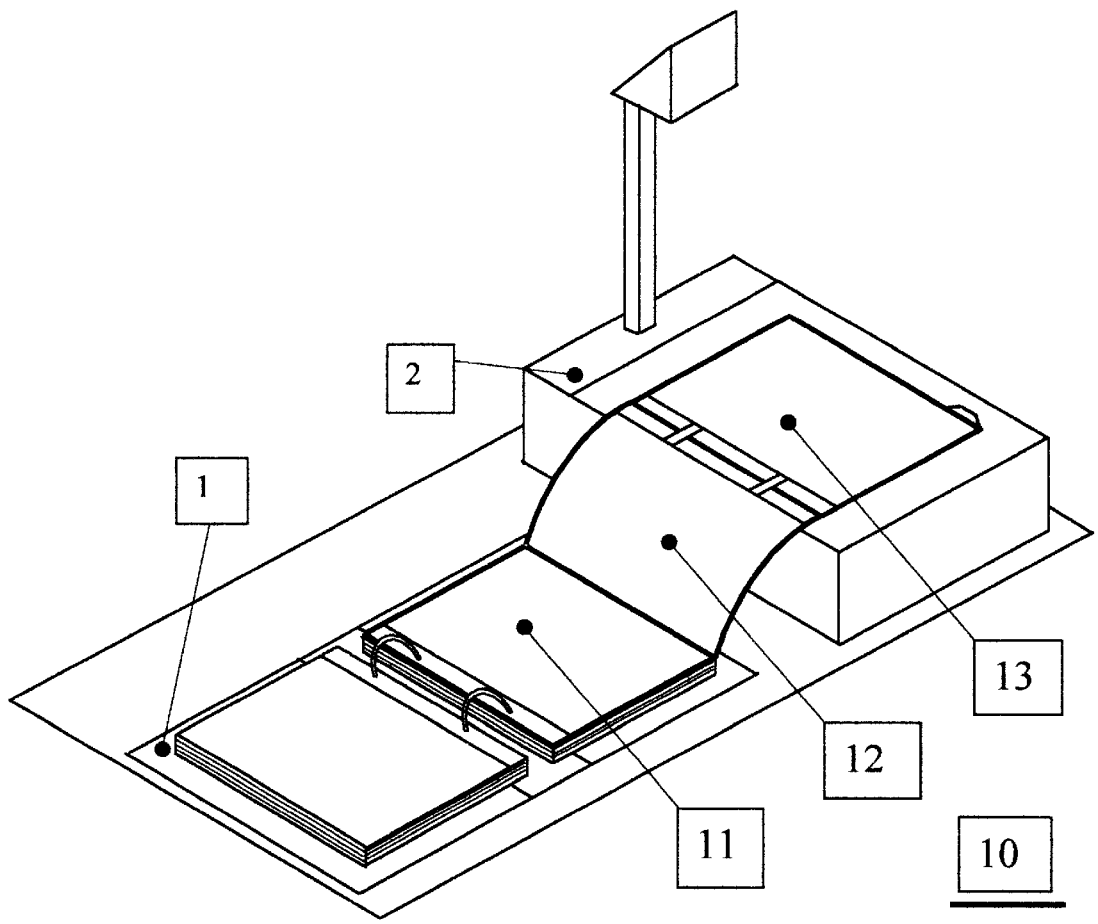
FIG. 1 is a general view that shows the use of the folder on an overhead projector.

FIG. 1 shows a realization of the folder (10) object of the invention. The folder is composed of three leaves (11), (12) and (13), each consisting of a transparent pocket, which are linked by means of flexible joints (indication 14 in FIG. 2) and shown here in the unfolded position as used for the projection. The third leaf (13) contains the transparency proper, and is placed on the glass of the overhead projector (2). The first leaf (11) is attached to the binder (1), which is here a ring binder, and being transparent it allows viewing here the following transparency in the binder. The second leaf (12) creates a link between the two others and is in addition used to file text or other material accompanying the transparency. If desired, the first leaf can also be used for storage of text.

Figure 2:
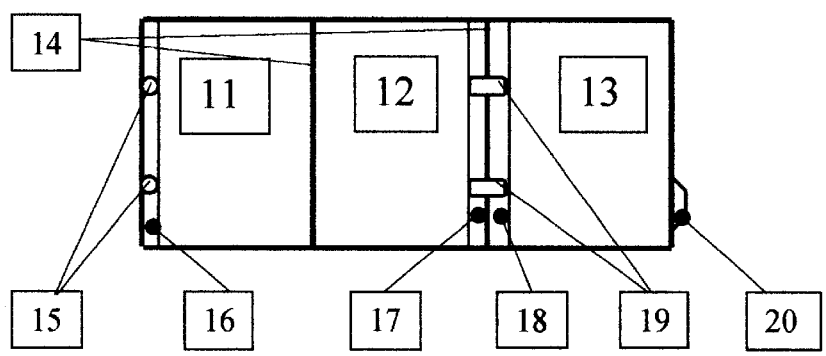
FIG. 2 shows the folder entirely unfolded to see better the details

FIG. 2 shows the details of this realization of the folder. The folder is realized by welding two layers of transparent plastic sheet together along a pattern formed by the peripheries of the leaves, leaving openings along some of the rims to form pockets for the introduction of the transparency and other papers, a method regularly used in the plastic industry. Alternatively it is realized by joining individual envelopes with thin adhesive tape forming flexible joints (14). The two methods have been used successfully. The first leaf (11) is fixed to the binder by means of perforations (15), or by other means dependant on the type of binder. These perforations are situated in a reserved zone (16) situated along the standard format. The other leaves (12) and (13) have, besides their standard format, similar reserved zones (17) and (18) that are equipped with slots (19) to avoid a conflict with the rings of the binder when folded in the binder. The leaves (12) and (13) can also be made without zones (17) and (18), staying outside the area of the rings, at the cost of a slight reduction of the range of extensibility. In fact the width of each of the leaves (11), (12) and (13) can in principle be chosen as desired as long as the second leaf is not wider than the first and that the third leaf has at least the width of the transparency to be projected.

The existence of the reserved zone (16) implies that the total width of the folder is slightly oversized as compared to the standard format (A4 for instance). However, this is the case for many transparent envelopes regularly used for the filing of standard sized papers and the standard binders have already been sized to dimensions slightly larger than the standard format they are supposed to file, in order to protect sufficiently the filed objects.

The third page (13) has been equipped with a tab (20) that permits identification of the transparency in the binder. This tab has been made with a re-usable sticker of "Post-it™" type. The sticker is fixed to the rim of the of the leaf by means of adhesive tape and oriented such as to have the sticker pointing outwards with the sticking zone next to the leaf and turned to the side of the glass of the projector and the non-sticking surface folded back over the sticking surface to prevent the glue from drying out when not used for fixation on the projection glass. For the projection this tab is used to fix, if necessary, the transparency on the glass of the overhead projector and assure its position. To obtain this, the sticker forming the tab is unfolded and the sticking part glued on the glass. After the projection and before folding of the folder, the sticker is folded back in the original position.

Figure 3:
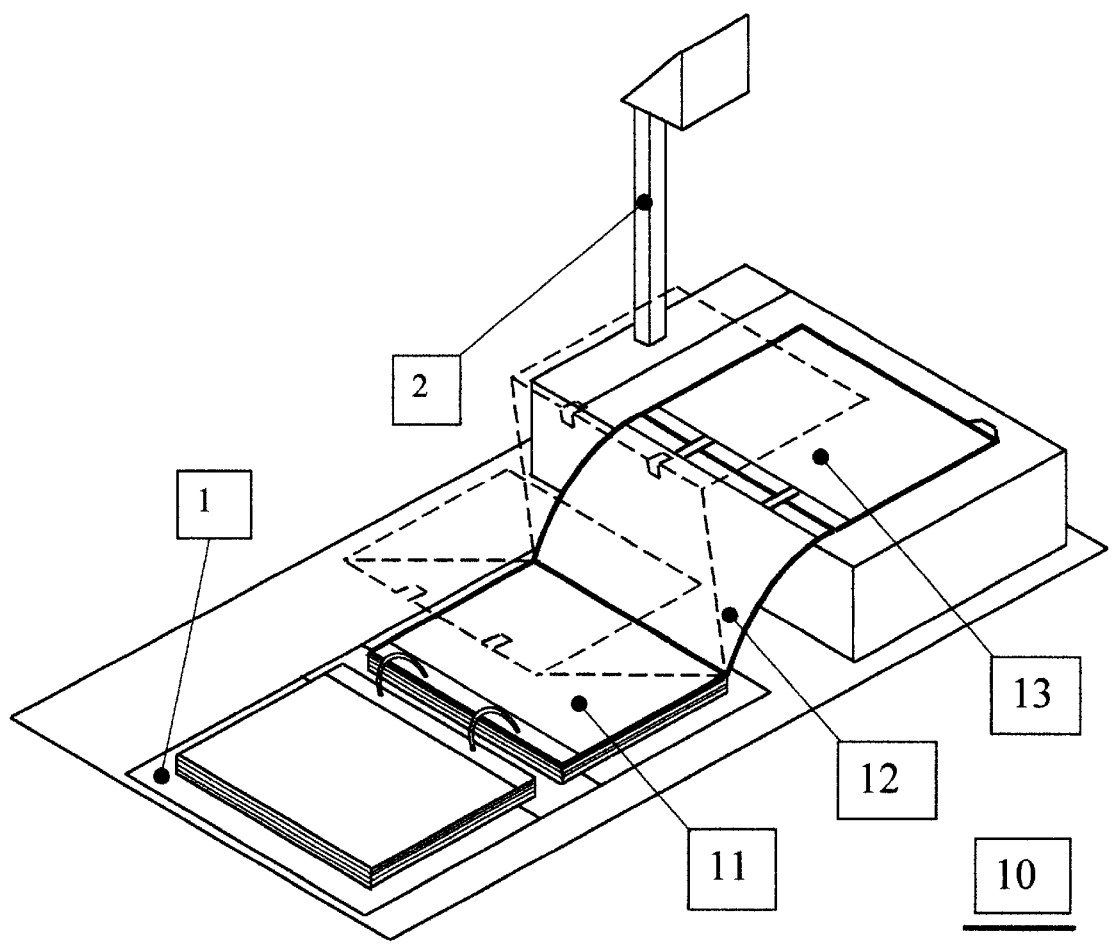
FIG. 3 shows again the use of the folder on an overhead projector but adds schematically the kinematics of the unfolding and folding as an "accordion".

To project the transparency on the overhead projector (FIG. 3), the binder (1) is placed on a table next to the overhead projector (2), opened at the folder with the desired transparency and the folder (10) is unfolded to position leaf

(13) containing the transparency on the glass of the overhead projector. The kinematics, shown in FIG. 3, uses as example a folder unfolding and folding in the form of an "accordion". In this unfolded position, while the projection proceeds, the text inserted in leaf (12) can be read whereas the transparent and empty leaf (11) allows viewing the following transparency for information to the speaker. After the projection the transparency is brought back into its filing position by folding the folder and a new selection can be made to project another transparency.

In the folded position the transparency can easily be read as it has a background formed by the rear side of the text in leaf (12). This text itself can easily be read from the other side turning the folder over, and this thanks to the transparency of the empty leaf (11). (Would the folder be folded in the form of an "envelope" where leaf (13) is folded under leaf (12) instead of on top of leaf (12), then the text should not be inserted in leaf (12) but this time in leaf (11) as leaf (12) should then stay transparent to allow viewing the filed transparency).

Figure 4:
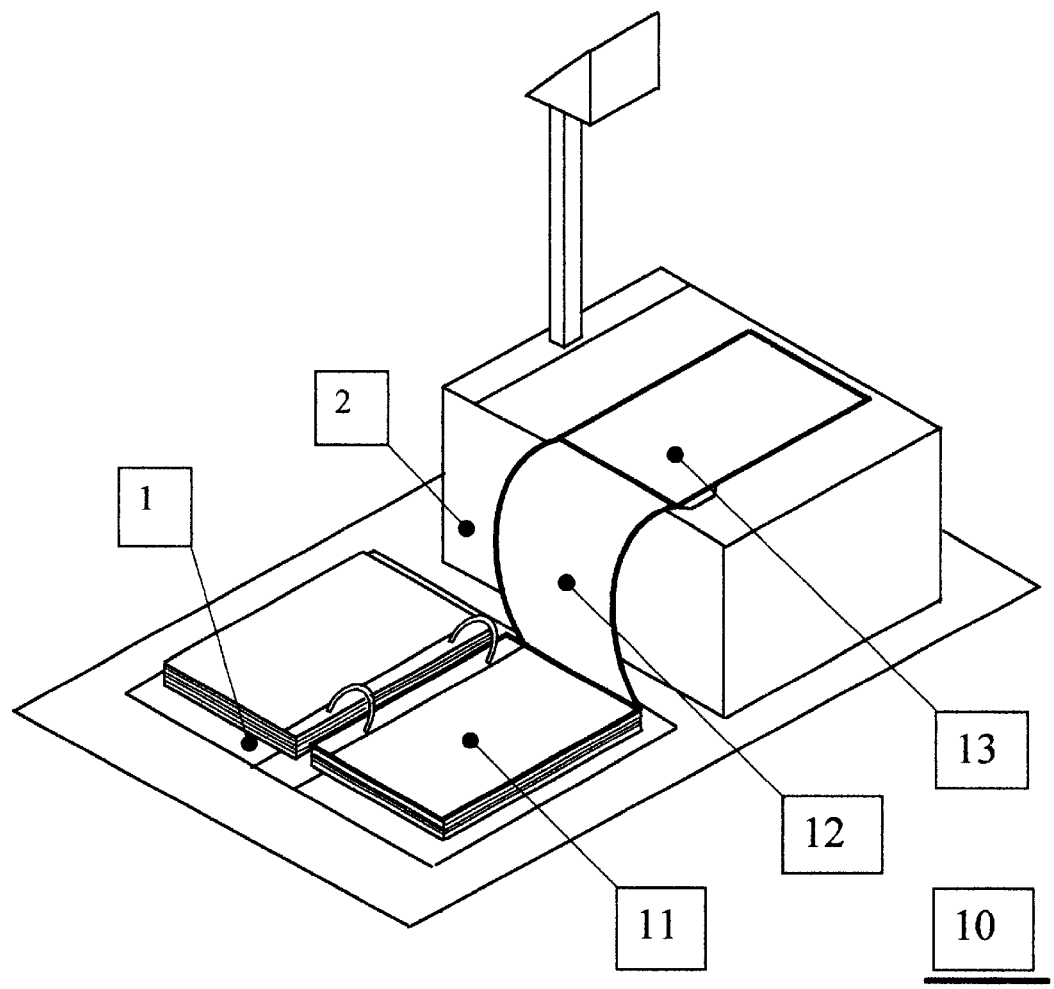
FIG. 4 shows a general view of the version of the folder most suitable for projecting transparencies of the "landscape" type of orientation.
Figure 5:
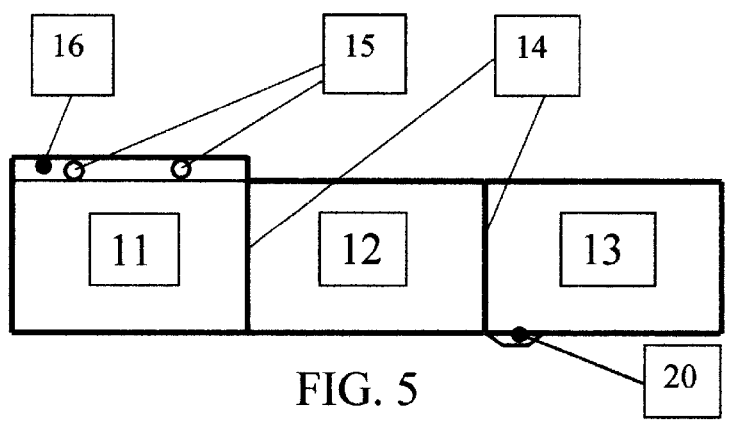
FIG. 5 shows the details of the version of the folder conceived for the projection of landscape-oriented transparencies.

For the transparencies of "landscape" orientation, it is advisable to make the folds over the shorter sides of the format instead of the longer sides (FIG. 4). This means that one must turn the binder (1) by 90 degrees as compared to the overhead projector in order to present the transparency correctly oriented. The unfolded folder takes the form shown in FIG. 5.

It should be noted that the system allows the use of more joints and leaves than the two flexible joints and three leaves of the example in order to increase the flexibility and the range of extensibility.

It should also be noted that the intermediate leaves need not necessarily to be pockets, they could for simplicity be executed in the form of single sheets of plastic or paper.

A special version consists of a folder where the third leaf (13 in FIG. 2) is initially reduced to just the zone (18) equipped in a way (for instance with an adhesive band) that the user can attach there later on his own transparent pocket or transparency.

With respect to the figures, the present invention may also be described as, a storage and presentation apparatus comprising a binder 1 engaging plural folders 10 as pages within the binder 1 where each of the folders 10 includes three or more leaves, the leaves joined in a side-by-side relationship. One of the leaves 11 is adapted, at a proximal edge thereof, for engaging the binder 1 functionally for storage of the associated folder within the binder 1 and far being turned within the binder 1 as a page. A further one of the leaves 12 is hingably engaged at a proximal edge thereof with a distal edge of the one of the leaves 11. A still further one of the leaves 13 is hingably engaged at a proximal edge thereof with a distal edge of the further one of the leaves 12, functionally enabling, the leaves to be folded into a face-to-face attitude for being turned as a page in the binder 1, and alternately for being unfolded into a side-by-side extended attitude for placement of the stilt further one of the leaves 13 onto a projector for projecting a transparency therewithin when the binder 1 and the projector are in physical adjacency as shown in FIG. 1. Preferably the still further one of the leaves 13 is either a transparent envelope holding a transparency, or it is the transparency itself alone. Preferably, the leaves 11–13 of each of the folders 10 are rectangular in shape having a longer and a shorter edges, and where said proximal edges and said distal edges are one of the longer and shorter sides, whereby portrait and landscape orientations of the transparency may be presented at the projector respectively. Preferably, the further one of the leaves 12 provides a rim adapted for joining the further one of the leaves 12 with the still further one of the leaves 13. In one embodiment, the further one of the leaves 12 is non-transparent, forming a background for better reading the transparency when the leaves are folded into the face-to-face attitude with the transparency placed on top of the folded stack. A further preferably alternative is to use a transparent further one of the leaves 12 so that the transparency may be folded under it instead of on top and still be able to see the transparency while the leaves 11, 12, 13 are in the face-to-face attitude. Preferably, the one of the leaves 11 of a first one of the folders 10 is transparent enabling viewing of a second transparency in a second one of the folders 10, the second one of the folders 10 residing under the first one of the folders 10, while projecting the first transparency of the first one of the folders 10. Preferably, the further one of the leaves 12 is a pocket having a top transparent face whereby information stored therein is visible while projecting the transparency. Preferably, the further one of the leaves 12 and the still further one of the leaves 13 each provides at least one slot 19, shown best in FIG. 2, positioned at a leaf attachment point of the binder 1 such as the rings shown, thereby enabling the leaves 11–13 to be stacked flat and coincidental within the binder 1. Preferably, at least one of the leaves 11–13 provides at least one tab 20 protruding outwardly therefrom and such tab 20 is preferably a removable sticker positioned and enabled for removeably fixing the still further one of the leaves 13 on the projector and the sticker preferably uses a low stick but tenacious adhesive so that it may be reapplied a number of times. Preferably, the hingable engagement between the leaves is made with an adhesive tape or similar material.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A storage and presentation apparatus comprising: a binder engaging plural folders as pages within the binder; each of the folders including three leaves, the leaves joined in a side-by-side relationship with a first one of the leaves adapted, at a proximal edge thereof, for engaging the binder; a second one of the leaves hingably engaged at a proximal edge thereof with a distal edge of the first one of the leaves; and a third one of the leaves hingably engaged at a proximal edge thereof with a distal edge of the second one of the leaves; the first, second and third ones of the leaves thereby enabled for folding into a face-to-face attitude, and alternately for being unfolded into a side-by-side extended attitude enabling placement of the third one of the leaves onto a projector for projecting a transparency held within the third one of the leaves; wherein the second one of the leaves provides a pocket having a top transparent face functionally enabling information stored therein to be visible.

2. The storage and presentation apparatus of claim 1, wherein the leaves of each of the folders are rectangular in shape having a longer and a shorter edges, and wherein said proximal edges and said distal edges are one of the longer and shorter sides, whereby portrait and landscape orientations of the transparency are presented at the projector respectively.

3. The storage and presentation apparatus of claim 1, wherein the second one of the leaves provides a rim adapted for joining the second one of the leaves with the third one of the leaves.

4. The storage and presentation apparatus of claim 1, wherein the second one of the leaves is non-transparent, forming a background for reading the transparency when the leaves are folded into the face-to-face attitude.

5. The storage and presentation apparatus of claim 1, wherein the first one of the leaves of a first one of the folders is transparent enabling viewing of a second transparency in a second one of the folders, the second one of the folders residing under the first one of the folders, while projecting the first transparency of the first one of the folders.

6. The storage and presentation apparatus of claim 1, wherein the second one of the leaves and the third one of the leaves each provides at least one slot positioned at a leaf attachment point of the binder, thereby enabling the three leaves to be stacked flat and coincidental within the binder.

7. The storage and presentation apparatus of claim 1, wherein at least one of the leaves provides at least one tab protruding outwardly therefrom.

8. The storage and presentation apparatus of claim 7, wherein the at least one tab is a removable sticker positioned and enabled for removeably fixing the still further third one of the leaves on the projector.

9. The storage and presentation apparatus of claim 1, wherein the hingable engagement between the leaves is made with an adhesive tape.

10. A storage and presentation apparatus comprising: a binder engaging plural folders as pages within the binder; each of the folders including plural leaves joined in a side-by-side relationship with a first one of the plural leaves engaging the binder functionally as a page; the leaves adapted for being folded into a face-to-face attitude, and alternately for being unfolded into the side-by-side relationship for placement of one of the leaves onto a projector for projecting a transparency therewithin wherein at least one of the leaves is a pocket having a top transparent face functionally enabling information stored therein to be visible.

11. The storage and presentation apparatus of claim 10, wherein the leaves of each of the folders are rectangular in shape having a longer and a shorter edges, and wherein said proximal edges and said distal edges are one of the longer and shorter sides, whereby portrait and landscape orientations of the transparency are presented at the projector respectively.

12. The storage and presentation apparatus of claim 10, wherein at least one of the leaves provides a rim adapted for joining another of the leaves.

13. The storage and presentation apparatus of claim 10, wherein at least one of the leaves is non-transparent, forming a background for reading the transparency when the leaves are folded into the face-to-face attitude.

14. The storage and presentation apparatus of claim 10, wherein one of the leaves of one of the folders is transparent, enabling viewing of a further transparency in a further one of the folders.

15. The storage and presentation apparatus of claim 10, wherein at least one of the leaves provides at least one slot positioned at a leaf attachment point of the binder, thereby enabling the leaves to be stacked flat and coincidental within the binder.

16. The storage and presentation apparatus of claim 10, wherein at least one of the leaves provides at least one tab protruding outwardly therefrom.

17. The storage and presentation apparatus of claim 16, wherein the at least one tab is a removable sticker positioned and enabled for removeably fixing one of the leaves on the projector.

18. The storage and presentation apparatus of claim 17, wherein the sticker has a low stick strength adhesive on one side thereof.

19. A storage and presentation apparatus comprising in combination: A transparency projector; and a binder, the binder engaging plural folders; each of the folders including a first, second and third leaves, wherein at least the third of the leaves is transparent, the leaves hingably joined so as to move between a mutual side-by-side relationship for viewing and a face-to-face relationship enabling turning the folder in the manner of a page in the binder; the binder positioned adjacent and lateral to the projector with, for viewing, the first of the leaves engaged with the binder and the third of the leaves laid flat on the projector for projecting a transparency within the third of the leaves.

* * * * *